Feb. 24, 1948.   D. C. FEATHER   2,436,560
COACTING CUTTING BLADES FOR SCISSORS, SHEARS, AND THE LIKE
Filed Aug. 7, 1944
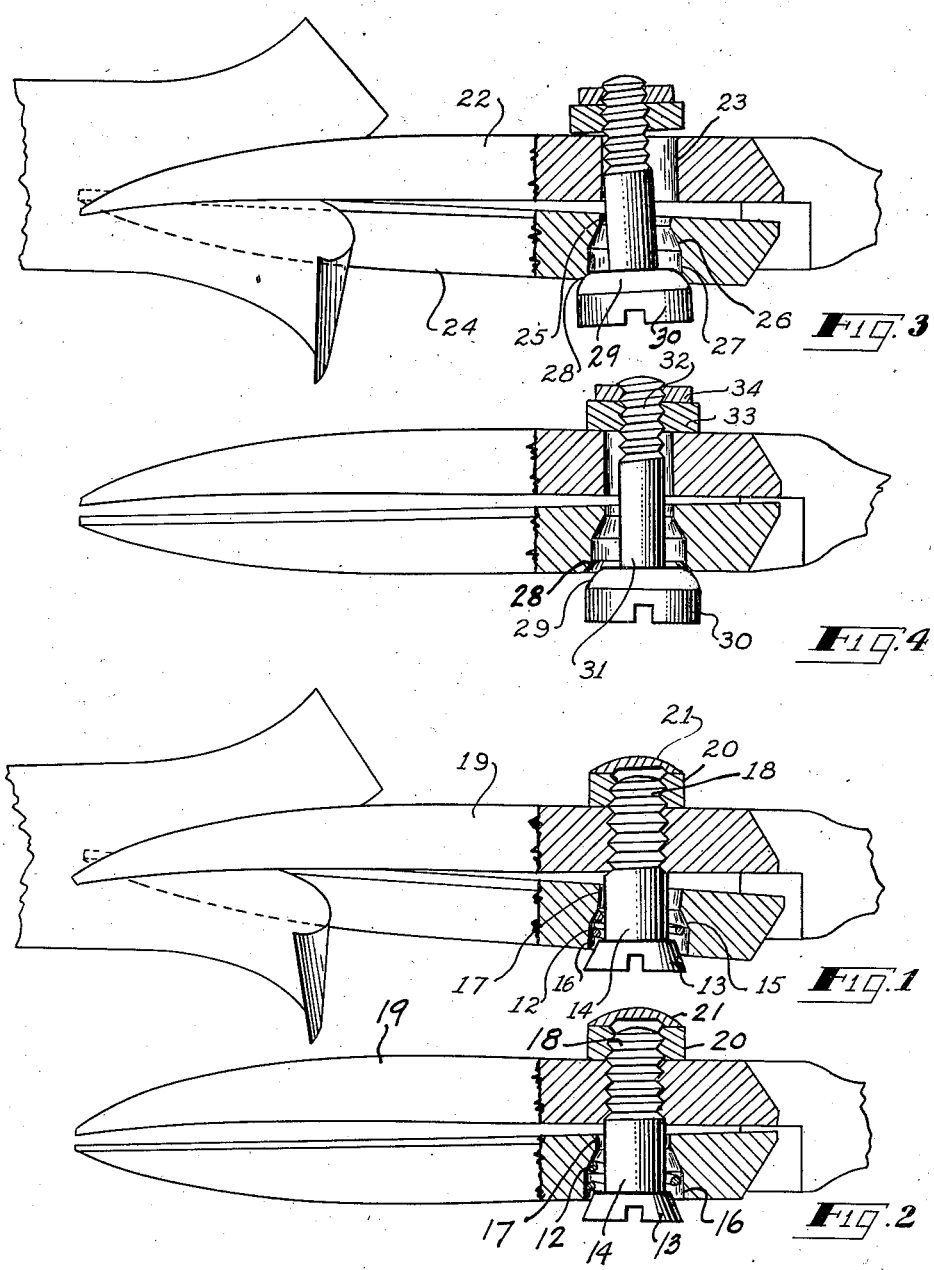
INVENTOR.
DAVID C. FEATHER Patented Feb. 24, 1948

2,436,560

UNITED STATES PATENT OFFICE 2,436,560

COACTING CUTTING BLADES FOR SCISSORS, SHEARS, AND THE LIKE

David C. Feather, Portland, Oreg., assignor of one-half to Mechanical Research Company, a corporation of Oregon Application August 7, 1944, Serial No. 548,380

2 Claims. (Cl. 30—266)

This invention relates to improvements in scissors, shears and all types of coacting cutting blades and more particularly to the pivotal connections between the blades.

It is one of the principal objects of the invention to provide means associated with the pivot pin and formed within the blades, for causing the latter to tilt into wiping angular cutting contact with each other at their cutting edges throughout the entire cutting operation. The amount of the cutting load, or rather the thickness or toughness of the material being cut determines the degree of pressure under which the blades come into wiping angular cutting contact with each other.

The angle of contact of one blade with the other renders them self-sharpening. This feature has been demonstrated by cutting various kinds of sheet metal, numerous strips of sandpaper, emery-cloth, and other abrasive and tenacious materials, which would otherwise dull conventional blades which work together in parallel flat surface contact.

A further object of the invention is that the blades may be loosely connected and freely pivotal for ease of operation, since the cutting load alone draws the blades together in cutting relationship without any squeezing or compressing effort on the part of the operator as heretofore. This feature may be demonstrated by operating what might be termed "right-handed" scissors or shears, embodying my invention, with the left hand.

The foregoing and other objects will appear as my invention is more fully hereinafter described in the following specification illustrated in the accompanying drawings, and finally pointed out in the appended claims.

In the drawing:

Figure 1 is a fragmentary sectional view of scissors made in accordance with my invention and shown in a cutting operation.

Figure 2 is a view similar to Figure 1, showing the blades in a relaxed or non-cutting position Figures 3 and 4 illustrate a modified form of the invention in cutting and non-cutting positions respectively.

Referring now more particularly to the drawing:

The form of the invention shown in Figures 1 and 2 is similar to that shown in Figures 3 and 4 and in addition includes a spiral spring 12 interposed between the head 13 of the pin 14 and the bottom of the tapered portion 15 of the counterbored portion 16 of the aperture 17, which, as shown, is of greater diameter than that of the pin so as to loosely embrace the same. The opposite end of the pin is threaded as at 18 for fixed engagement with the blade 19. The outermost end of the pin extends beyond the blade 19 and is provided with a lock-nut 20, over which, when it is set into place, is applied a covering such as solder or the like to prevent any disturbance of the setting of the lock-nut.

In Figures 3 and 4, the blade 22 is formed with an enlarged straight wall aperture 23 and the blade 24 is formed with an aperture 25 of equal diameter to that of the aperture 23 and is tapered as at 26, the taper merging with a counter-bored portion 27, whose outer edge is bevelled as at 28 to form a seat for the correspondingly flared portion 29, of the head 30 formed on one end of the pivot pin 31. The opposite end of the pivot pin is threaded as at 32 for engagement with a nut 33 backed by a lock-nut 34, for adjusting and locking the blades in any desired working relation to each other.

When the blades, in either form of the invention, are pressed against the material being cut, the resistance of the material causes the blades to tilt toward each other both in the direction of their width and also of their length as one or both blades take up the slack between the pivot pin and the enlarged aperture or apertures surrounding it, the fulcrum occurring at any point of contact between the head of the pin and the outer edge of the enlarged aperture through the blade.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

1. A pair of pivotally connected coacting cutting blades, axially aligned apertures extending through said blades, one of said apertures being enlarged at its outer edge, a pivot pin extending through the apertures and loosely embraced by one and threadedly connected with and locked to the other, said loosely embraced portion of the pin terminating in a flared head in rotatable and tiltable contact with the outer rim of said enlarged aperture.

2. A pair of pivotally connected coacting cutting blades, axially aligned apertures extending through said blades, one of said apertures being enlarged at its outer edge, a pivot pin extending through the apertures and loosely embraced by one and threadedly connected with the other, said loosely embraced portion of the pin terminating in a flared head in contact with the outer rim of said enlarged aperture to form a fulcrum point and adapted thereby upon movement of one blade with respect to the other to draw the cutting edges of the blades together when the blades are actuated against a cutting load disposed between them, and resilient means disposed between said head and the inner end of the enlarged portion of said one of said apertures.

DAVID C. FEATHER.

REFERENCES CITED

The following references are of record in the file of this patent:

UNITED STATES PATENTS

| Number | Name | Date |
|---|---|---|
| 842,650 | Greenfield | Jan. 29, 1907 |
| 1,886,273 | Thomson | Nov. 1, 1932 |
| 188,601 | Delkescamp | Mar. 20, 1877 |
| 517,244 | Seymour | Mar. 27, 1894 |
| 2,239,851 | Lincoln | Apr. 29, 1941 |
| 2,033,216 | Whyte | Mar. 10, 1936 |